United States Patent [19]
Sanford et al.

[11] 4,098,310
[45] Jul. 4, 1978

[54] APPARATUS FOR BEVELING TRUSS COMPONENTS

[75] Inventors: Arthur Carol Sanford, Pompano Beach; Fritz Waechter, Coconut Creek, both of Fla.

[73] Assignee: Arthur Carol Sanford, Pompano Beach, Fla.

[21] Appl. No.: 776,828

[22] Filed: Mar. 14, 1977

[51] Int. Cl.² .............................................. B27M 3/00
[52] U.S. Cl. ............................... 144/3 R; 144/326 R;
144/30; 144/133 R; 144/203; 83/360; 83/409; 83/435.1
[58] Field of Search ........... 144/326, 3 R, 203, 133 R, 144/30; 83/360, 409, 435.1

[56] References Cited
U.S. PATENT DOCUMENTS

| 395,526 | 1/1889 | Totman | 144/203 |
|---|---|---|---|
| 3,078,888 | 2/1963 | Bruemmer | 144/326 |
| 3,388,727 | 6/1968 | Kotila | 83/409 |
| 3,721,139 | 3/1973 | Robinson et al. | 83/360 |

*Primary Examiner*—Donald R. Schran
*Attorney, Agent, or Firm*—Hamilton, Renner & Kenner

[57] ABSTRACT

Apparatus for cutting off and beveling the ends of wood web components for trusses. A length of lumber is guided longitudinally into the machine against a stop and clamped near its lead end, following which the clamped portion is cut off to component length, the stop retracted, and the clamped portion automatically moved laterally to pass its ends across a pair of two-way beveling saws. The beveled clamped portion is then returned to starting position where it is automatically unclamped and then manually pushed longitudinally past the retracted stop to be engaged by an ejection device which discharges the component from the machine and automatically extends the stop into the path of the next component.

6 Claims, 5 Drawing Figures

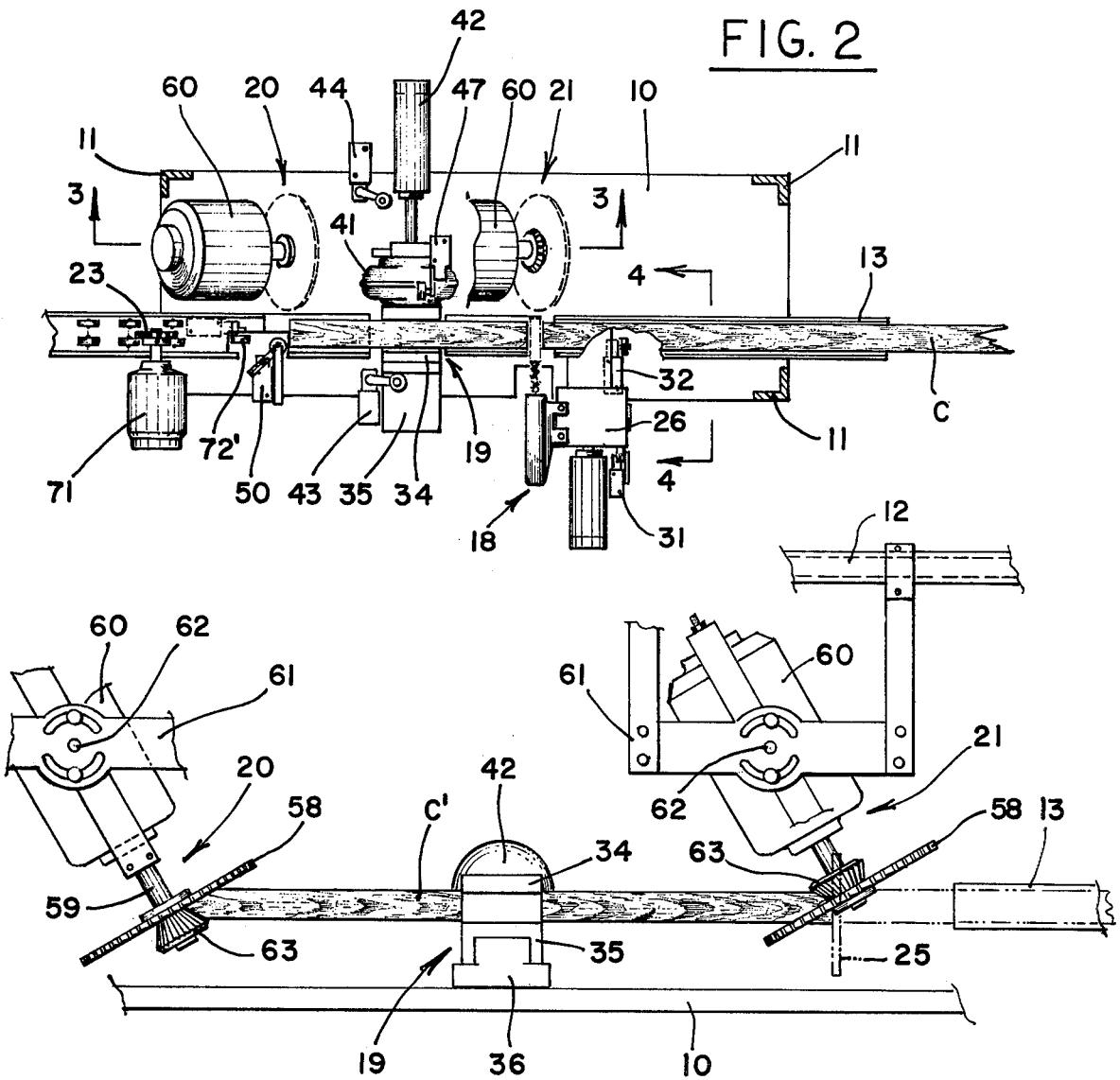

APPARATUS FOR BEVELING TRUSS COMPONENTS

BACKGROUND OF THE INVENTION

The present invention relates to wood and metal trusses having wood web components which have beveled ends abutting the truss chords. The trusses may have parallel wood chord members with alternate diagonal wood web members and metal web members such as disclosed in the copending application of Arthur Carol Sanford, Ser. No. 759,072, filed Jan. 13, 1977, now U.S. Pat. No. 4,034,686 and entitled Combination Wood and Metal Truss Structure.

The truss disclosed in said application has wood web members which are beveled at their ends in two angular directions for fitting into angular undercut notches in the inner opposing faces of the truss chords. It is very important that the wood web members be accurately cut to length and that their ends be beveled in two angular directions at close tolerances so that when assembled the beveled ends will fit into the pre-cut notches in the chords accurately and closely to form tight joints for efficiently transmitting the stresses to which the truss is subjected. It is extremely difficult, if not impossible, to cut and bevel the ends of such wood components manually with the required degree of accuracy, and at best it is a laborious and time-consuming operation.

SUMMARY OF THE INVENTION

The present improved apparatus is adapted automatically to cut wood components to proper length, bevel both ends in two directions, and eject the finished components.

Another object of the present invention is to provide improved apparatus which will cut off and accurately bevel the ends of the components, rapidly and with extreme accuracy.

A further object is to provide improved stop means extensible into the path of a length of lumber to gauge the component length from the cutoff saw, said top means being automatically retracted to allow longitudinal discharge of the finished component.

Another object is to provide improved longitudinally spaced rotating beveling saws for beveling the ends of the components in two angular directions simultaneously.

A further object is to provide improved means for clamping each component and moving its ends laterally across the beveling saws.

A still further object is to provide an improved ejection device for longitudinally ejecting a finished component when its leading end is pushed into the device and for automatically extending the stop means into the path of the next component.

These and other related objects are accomplished by the improved apparatus and the improved parts and combinations thereof, a preferred embodiment of which is shown by way of example in the accompanying drawings and described in detail in the following specification. Various modifications and changes in details of construction are embraced within the scope of the appended claims.

BRIEF DESCRIPTION OF THE DRAWINGS

FIG. 2 is a schematic plan view of the apparatus showing frame parts broken away.

FIG. 3 is an enlarged sectional view, with distant parts removed, substantially on line 3 — 3 of FIG. 2, showing the ends of a component passing through the beveling saws.

DESCRIPTION OF A PREFERRED EMBODIMENT

Figure 1:
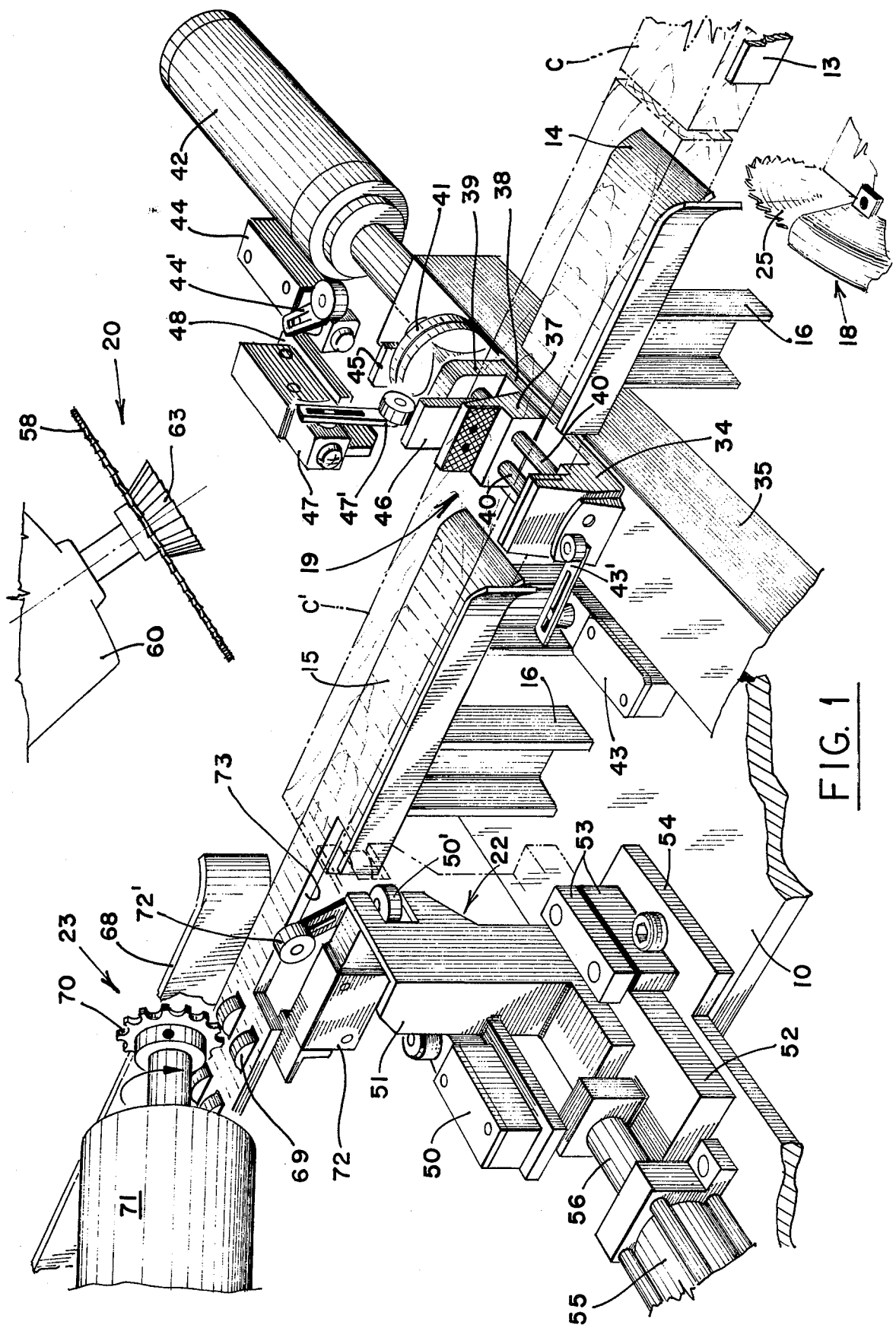
FIG. 1 is a perspective view of the improved apparatus, with parts broken away and certain frame and support members omitted for clarity.

In the drawings the electrical conductors and piping connected to the fluid cylinders have been omitted for the sake of clarity.

The improved apparatus is mounted on a suitable frame including a table or platform 10 supported on suitable posts (not shown) and having a superstructure including vertical and horizontal angles 11 and 12 shown fragmentarily in FIGS. 2 and 3.

Longitudinal guide means for guiding the component lumber C into and through the machine includes a channel 13 approaching the cutoff saw, and longitudinally aligned angles 14 and 15 (FIG. 1) beyond the cutoff saw and supported on the table 10 by vertical channels 16.

A rotary cutoff saw indicated generally at 18 is slidably mounted on table 10 for reciprocable lateral movement transversely of the guide means, vise means for clamping a component portion C' is indicated generally at 19 and is reciprocably movable transversely of the guide means to engage the ends of portion C' with the rotary beveling saws indicated generally at 20 and 21 and to return the beveled component to alignment with the guide means. Stop means indicated generally at 22 is extendable into alignment with the guide means for stopping the incoming component at the required distance from the cutoff saw, and ejecting means, indicated generally at 23, discharges the beveled component from the machine.

Figure 4:
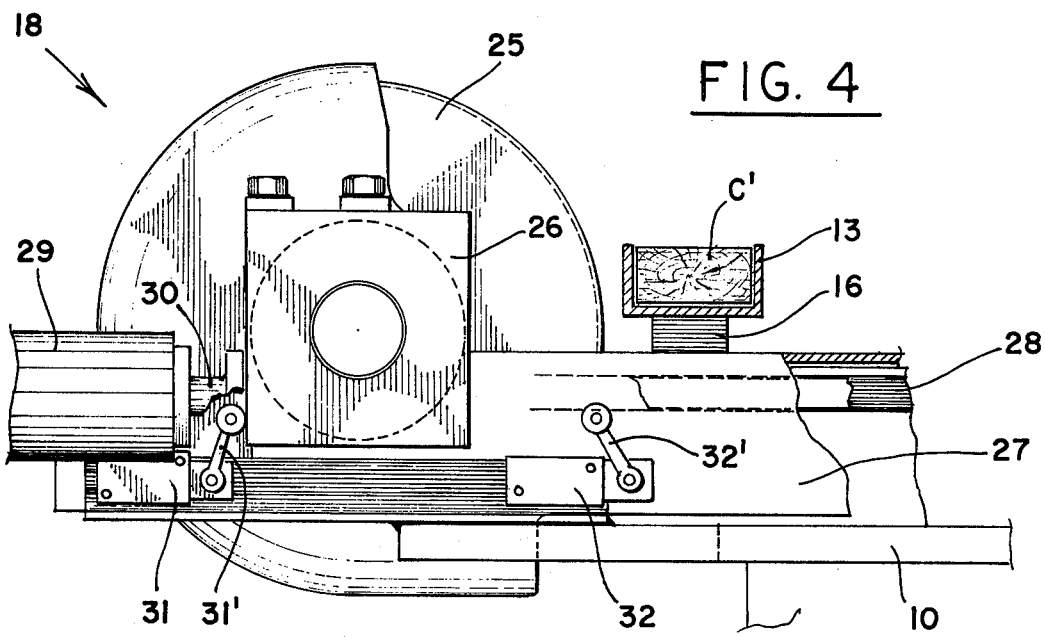
FIG. 4 is a cross-sectional view as on line 4 — 4 of FIG. 2, showing the cutoff saw retracted.
Figure 5:
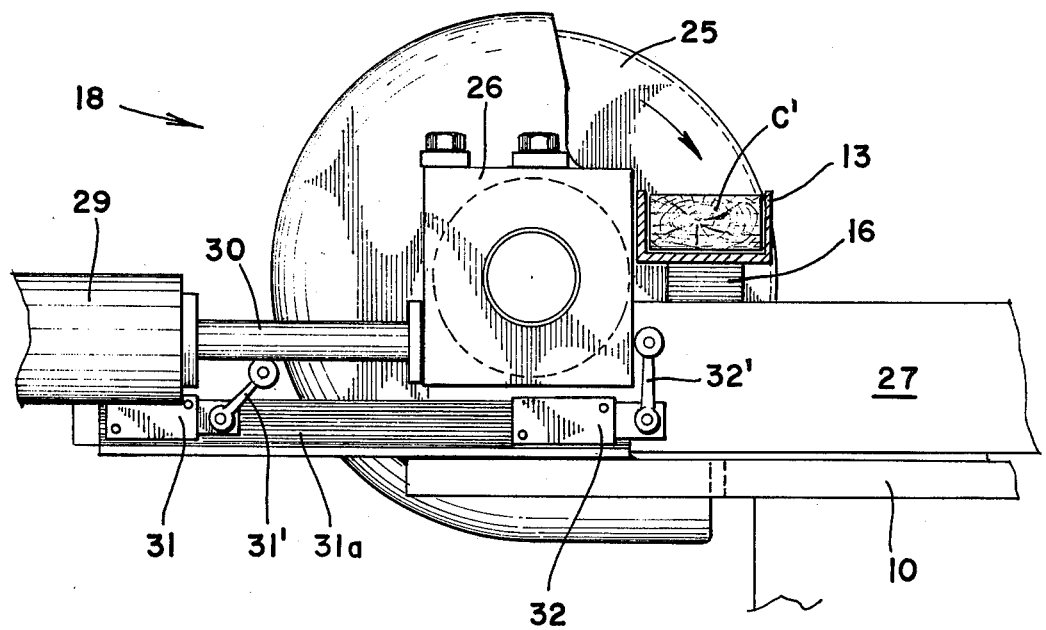
FIG. 5 is a similar view showing the cutoff saw extended to cut off a component.

The rotary cutoff saw 18 has a rotary saw blade 25 mounted on the shaft of an electric motor mounted in motor housing 26 carried on the slide housing 27 which is slidably mounted on the ways 28 (FIG. 4) for movement transversely of the guide 13 to the position of FIG. 5 when the component portion C' has been completely severed at right angles to component C. A fluid cylinder 29 supported on table 10 has a piston rod 30 attached to housing 26 and micro limit switches 31 and 32 having switch arms 31' and 32', respectively, are mounted on a support bar 31 on table 10 in the path of motor housing 26. As seen in FIGS. 4 and 5, the switch arm 31' is actuated by motor housing 26 at the end of its reversing movement and switch arm 32' is actuated by housing 26 at the end of its extending movement.

The vise means 19 comprises a vertical jaw 34 fixedly mounted on the top of a slide 35, slidably supported on a track 36 supported on table 10 (FIG. 3). As seen in FIG. 1, a movable jaw 37 is slidably supported on a horizontal plate 38 extending from the base of jaw 34 and connected behind the movable jaw to a vertical flange 39. The movable jaw 37 is slidably supported on a pair of guide rods 40 extending between the fixed jaw 34 and flange 39. A small fluid cylinder 41 carried on slide 35 is operatively connected to the movable jaw 37 for moving it toward and away from the fixed jaw 34 to clamp and unclamp the component C' supported in guides 14 and 15.

The slide 35 is connected to the piston of a fluid cylinder 42 for moving it reciprocably transversely of the guide means, the cylinder 42 being supported on the table 10. A limit switch 43 having an arm 43' is supported on the table for contacting the fixed jaw 34 when the slide 35 is in the retracted position of FIG. 1, and a limit switch 44 having an arm 44' is carried on the table for contacting a plate 45 on cylinder 41 when the slide is extended to pass the ends of a component C' held in the vise jaws across the beveling saws 20 and 21. The movable jaw 37 has an upwardly extending plate 46 for contacting the switch arm 47' of a limit switch 47 carried on a bracket 48 when the movable jaw 38 is in open position.

The stop means 22 preferably comprises a limit switch 50 having an arm 50' and mounted on a bracket 51 carried on a slide 52. The slide 52 is slidably mounted in ways 53 on a base plate 54 secured on the table 10 for movement transversely of the guide means. A fluid cylinder 55 supported on base plate 54 has a piston 56 connected to slide 52 for extending limit switch arm 50' within the guide 15 to abut the end of component C' as shown in phantom in FIG. 1, and to retract the switch arm to the full line position.

The beveling saws 20 and 21 each have a circular toothed blade 58 carried on the shaft 59 of an electric motor 60 for high speed rotation. As shown in FIG. 3, each motor 60 is adjustably mounted on a horizontal axis for setting the angularity of the blade 58 with respect to the longitudinal axis of the component. This angle varies for components according to the height of the truss in which they are used. As shown, each motor is mounted in a bracket 61 suspended from the frame for rotatable adjustment about the axis 62 of the motor. The saw blades 58 bevel the ends of the component C' at a given angle in one direction, and an opposed bevel is simultaneously cut intersecting the first bevel at a given angle by means of an undercut beveled routing cutter 63 secured to the motor shaft 59 of the motor 60 at the center of the saw blade 58. As seen in FIG. 3, the routing cutter 63 of saw 20 is mounted below the blade 58 and the cutter 63 of saw 21 is mounted above the blade 58. The angle cut made by the routing cutter is preferably less than 90° to fit an undercut notch in the inner face of a truss chord.

The ejecting means 23 preferably comprises a channel guide 68 extending beyond the stop means in alignment with the guide angle 15. The bottom of the guide 68 preferably has conveyor rollers 69 therein, and a toothed ejecting wheel 70 carried on the shaft of electric motor 71 is positioned above the bottom of guide 68 at such distance as to engage the top surface of a component C' pushed thereunder from guide angle 15 and impel it rapidly over the rollers to discharge it from guide 68.

A limit switch 72 is carried on the underside of guide 68 and has an upwardly biased switch arm 72' normally extending above the guide bottom wall through a slot 73 therein. The switch arm 72' is depressed by a component C' passing thereover, and after passage the arm wings upwardly to normal position, thereby energizing suitable electrical circuitry to extend the switch arm 50' into the guide means in the path of an incoming component C'.

In the operation of the improved apparatus, a starting switch (not shown) is electrically connected to the cutoff saw motor 26, the beveling saw motors 60, the ejecting wheel motor 71, and to a conventional solenoid valve for extending the slide 52 to position the top switch arm 50' within the guide 15. When the starting switch is actuated the apparatus is ready to cut and bevel truss components, and a length of component lumber C which may be a standard 2 × 4, is introduced longitudinally through guides 13, 14 and 15 until the leading end contacts switch arm 50'. It is to be understood that the several limit switches control the operation of the various fluid cylinders by means of electrically actuated conventional solenoid valves (not shown) in a well known manner.

The limit switch 50 is electrically connected to a solenoid valve for energizing the cylinder 41 to close movable vise jaw 37 and clamp the component portion C' in the vise. The limit switch 47 is electrically connected to a solenoid valve for operating the piston in fluid cylinder 29, and switch arm 47' is normally open when contacted by plate 46 on jaw 27. When the jaw 37 moves away from switch arm 47' toward closing position the switch 47 is actuated to operate the cutoff cylinder 29 and move the saw 25 transversely of the guide means and cut off the component C' at 90°.

At the end of the advance movement of the saw the motor housing 26 actuates the switch arm 32' of limit switch 32, as shown in FIG. 5, which is electrically connected to a solenoid valve for reversing the movement of the saw and returning it to the position of FIG. 4, where it contacts switch arm 31 40 of limit switch 31. The switch 31 is electrically connected in circuit with a solenoid valve for operating fluid cylinder 55, and also with a solenoid valve for operating cylinder 42. When limit switch 31 is contacted the stop switch arm 50' is retracted by piston rod 56 and the operation of cylinder 42 pulls the slide 35 along with the vise means and component C' transversely to move its ends across the beveling saws 20 and 21.

At the end of the forward or extension stroke of the vise means, the plate 45 contacts switch arm 44' of limit switch 44 to reverse the piston in cylinder 42 and retract the vise means to the position of FIG. 1 where the stationary jaw contacts switch arm 43' which operates cylinder 41 to open the vise and release the beveled component C' so that it can be pushed manually longitudinally into the guide 68 and in engagement with the ejecting wheel 70. The wheel 70 rapidly impels the component C' over the rollers 69 to discharge it from the machine.

In passing into the guide 68 the component C' depresses the switch arm 72' and when the component has passed the arm 72' returns to its upward position. The switch 72 is electrically connected to switch 50, and the upward return movement of arm 72' operates the cylinder 55 to return the stop switch arm 50' within the guide 15 in readiness to contact the leading edge of another incoming component.

The improved apparatus is compact and efficient and all operations except entering the component lumber and pushing the finished component into the ejecting means are fully automatic. The ends of each component are quickly and accurately beveled in two angular directions simultaneously, so as to conform to angular notches in truss chords abutting the ends of the components.

What is claimed is:

1. Apparatus for cutting wood components to accurate length and beveling the ends, comprising a frame, longitudinal guide means on said frame, stop means extendable into alignment with said guide means for limiting movement of a length of component lumber in said guide means, laterally reciprocable vise means on the frame for clamping a component portion of said lumber positioned in said guide means, a cutoff saw movable reciprocably on the frame transversely of said guide means to cut off a wood component to required length, means automaticaly to retract said stop means at the end of the return stroke of said cutoff saw, a pair of longitudinally spaced beveling saws mounted on the frame laterally opposite the ends of said component, each saw comprising a rotary blade for beveling in one direction and a tapered routing cutter mounted at the axis of said blade for simultaneously beveling in another direction, and means to bodily move said vise means reciprocably transversely to move the ends of a component clamped therein across the beveling saws.

2. Apparatus as defined in claim 1, wherein means is provided to actuate the vise means automatically for clamping a component portion of said lumber when the end thereof contacts said stop means.

3. Apparatus as defined in claim 2, wherein means actuated by said vise clamping movement automatically moves the cutoff saw laterally to cut off a component.

4. Apparatus as defined in claim 1, wherein means is provided automatically to reverse the lateral movement of the vise means and means actuated at the end of the reverse movement of said vise means automaticaly opens said vise means.

5. Apparatus as defined in claim 4, wherein ejecting means is provided to eject a finished component longitudinally of said guide means.

6. Apparatus as defined in claim 5, wherein contact switch means is provided at said ejecting means for extending said stop means into alignment with said guide means automatically by passage of a finished component.

* * * * *